(12) United States Patent
Wilding et al.

(10) Patent No.: US 6,813,623 B2
(45) Date of Patent: Nov. 2, 2004

(54) METHOD AND APPARATUS FOR CHUNK BASED TRANSACTION LOGGING WITH ASYNCHRONOUS INPUT/OUTPUT FOR A DATABASE MANAGEMENT SYSTEM

(75) Inventors: Mark Francis Wilding, Barrie (CA); Roger Luo Quan Zheng, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 09/882,668

(22) Filed: Jun. 15, 2001

(65) Prior Publication Data
US 2003/0009477 A1 Jan. 9, 2003

(51) Int. Cl.[7] .............................................. G06F 17/30
(52) U.S. Cl. ........................................ 707/200; 707/10
(58) Field of Search ...................... 707/200, 10, 104.1; 709/107, 223, 228, 236, 238; 711/146, 150, 158, 141; 710/39, 125, 310; 714/4, 15, 43

(56) References Cited

U.S. PATENT DOCUMENTS

| | | |
|---|---|---|
| 5,375,232 A | 12/1994 | Legvold et al. |
| 5,455,947 A | 10/1995 | Suzuki et al. |
| 5,544,359 A | 8/1996 | Tada et al. |
| 5,623,628 A * | 4/1997 | Brayton et al. ............. 711/141 |
| 5,737,600 A | 4/1998 | Geiner et al. |
| 5,832,508 A * | 11/1998 | Sherman et al. ............ 707/200 |
| 5,903,898 A | 5/1999 | Cohen et al. |
| 6,021,408 A | 2/2000 | Ledain et al. |
| 6,052,695 A | 4/2000 | Abe et al. |
| 6,131,094 A | 10/2000 | Gord |
| 6,189,069 B1 | 2/2001 | Parkes et al. |
| 6,425,023 B1 * | 7/2002 | Batchelor et al. ............. 710/39 |
| 6,578,160 B1 * | 6/2003 | MacHardy et al. ........... 714/43 |

* cited by examiner

Primary Examiner—Diane D. Mizrahi
(74) Attorney, Agent, or Firm—Sughrue Mion, PLLC (57) ABSTRACT

A method and apparatus are provided for storing transaction data for a plurality of database applications in a multiple access database management system having permanent storage and a transaction log buffer to store data for said database applications before transferring said data to said permanent storage, wherein database connection agents associated with said applications are used to store data in said transaction log buffer, including granting exclusive write access reservations in said transaction log buffer to a plurality of said database connection agents; and allowing database connection agents to write transaction data records to previously granted write access reservations while granting exclusive access reservations to other database connection agents.

40 Claims, 3 Drawing Sheets

METHOD AND APPARATUS FOR CHUNK BASED TRANSACTION LOGGING WITH ASYNCHRONOUS INPUT/OUTPUT FOR A DATABASE MANAGEMENT SYSTEM

FIELD OF THE INVENTION

This invention relates to the field of transaction logging in the storage of data in database management systems (DBMS) such as relational database management systems.

BACKGROUND OF THE INVENTION

For reliable operation of a database management system, integrity and consistency are needed for the storage and updating of data for the database management system. To facilitate this requirement, one of the key features of a mature database management system is transaction logging. For each change to the database content, there is one or more log record that describes this change. Each log record is assigned a specific sequence number and log records are eventually transferred to permanent storage in same order as this sequence number. These log records must eventually be placed on permanent storage in order to ensure consistency and to provide a history of changes to the database. For relational database management systems (RDBMS) such as DB2, transaction logging is an integral process involved in making changes to the data contents of the database tables stored by the RDBMS. These changes include inserting, deleting or updating the database contents. For mature database management systems, transaction log records are first logged by database connection agents in a transaction log buffer in memory before being transferred to permanent storage such as a disk. The database manager generally has a dedicated thread of execution called the logger to manage the transferring of data from log buffer to permanent storage. The purpose of the transaction log buffer is to reduce the cost of small changes to the database contents by making the cost of logging of these small changes relatively inexpensive. Placing transaction log records into a log buffer is relatively simple when a single database application is involved since there is no contention for the use of the transaction log buffer by other application. The speed at which transaction logging takes place is dependent on the amount of data that the single application provides for transaction logging and the frequency that the application makes changes to the database contents. Transaction logging for a single database application can be handled in a simple serial fashion and there is no contention on the transaction log buffer. However; the situation becomes more complex for a database management system which can serve multiple database connections simultaneously. An efficient transaction logging mechanism is required that can handle the logging of data by multiple database applications to multiple database tables on permanent storage. With multiple database applications, contention for the transaction log buffer can inhibit transaction logging performance due to the serialized access to the transaction log buffer. For workloads which involve a high frequency of transactions that make changes to the database contents, transaction logging can become a performance bottleneck.

In prior art, changes made to the database by multiple database applications making use of the RDBMS involved granting exclusive access to the log buffer to one database connection agent (a database connection agent in this context is a task or process that resides in the RDBMS engine and performs various operations on behalf of a database application). The access to the log buffer is sequential, requiring other database connection agents to wait until the current database application's data had been copied into the log buffer. This serialized access can have a large negative impact to transaction logging throughput since only one database connection agent can copy transaction log records at any given time.

The following generally summarizes the steps taken in prior art when a transaction log record was copied into the transaction log buffer:

1. Obtain a latch (a latch in this context is simply a high speed mutually exclusive locking mechanism) which protects the transaction log buffer from having more than one database connection agent copying a transaction log record into it. Once the transaction log buffer is latched by one database connection agent, other database connection agents must wait until the latch is freed and the latch is obtained by the database connection agent.
2. Copy the transaction log record into the transaction log buffer starting at the current log buffer offset.
3. Update the transaction log buffer offset which marks the location that the next transaction log record should be copied to.
4. Release the latch which protects the transaction log buffer so that other database database connection agents can attempt to obtain the latch.

One problem in the prior art is that there is too much serialization in accessing the log buffer. It appears that there is no recognition in the prior art that the latch is only needed to determine the sequential order of the log records and the location in the log buffer for loading log record data. We have found that it is not necessary (at least for the purpose of determining the sequential order of log records) to hold the latch while copying log record data into the log buffer. If database connection agents are allowed to copy their log record data after releasing the latch (so multiple database connection agents can be copying concurrently), a problem is not knowing when database connection agents will have finished copying data into the log buffer.

We have found that the logger, which is used to transfer data records from the transaction log buffer to main storage needs to know when it can start transferring data from the log buffer to permanent storage. One aspect of this invention addresses this.

The prior art also had to contend with two competing goals when trying to improve transaction logging performance: one being application response time and the second being overall transaction logging throughput. This issue is related to the transferring of data from the log buffer to permanent storage. The performance of a storage device such as a disk usually varies with the amount of data for each transfer, and generally increases with the transfer size up to a certain level, depending on system characteristics, after which the performance gain becomes smaller for increasing transfer size. A storage device has a transfer size (or a range of transfer sizes) at which data transferring becomes efficient and levels off with larger transfer sizes. However, during the operation of the logger, there may be different amounts of data available in the logger buffer ready to be transferred to permanent storage. If the logger is implemented with logic to initiate the data transfer for all data available in the log buffer, the size of the transfer may be very large resulting in poor response time for some of the applications making use of the RDBMS. It is also possible that the amount of data to be transferred may be too small for good efficiency, which can result in poor system throughput. Taken to the extreme, if the logger writes each transaction record to storage one at a time, then each change to the database would have to endure the cost of writing a log record to permanent storage. While writing a specific log record to storage immediately benefits the individual database connection agent which made the request, the overall throughput is hindered, as will be appreciated by those skilled in the art. On the other hand, the overall throughput can benefit from waiting for a number of transaction records to be copied into the log buffer and then transferring them all to permanent storage at the same time. The longer the transaction logging task waits, the worse the potential response time to an individual request and the shorter the transaction logging task waits, the worse the overall throughput. One aspect of this invention addresses this issue by providing a preselected data transfer amount for use by the logger in transferring data from the log buffer to permanent storage.

Another potential problem with prior art is that the transaction logging task (performed by the logger) was responsible for both writing transaction records to permanent storage and performing other work. The other work may involve responding to various requests (for example, reading some of the transaction records that have been previously written to the storage) from potentially thousands of database connection agents. While the transaction logging task is handling the transfer of transaction records to permanent storage, it is not able to perform other work and while the transaction logging task is performing other work, it is not able to transfer transaction records to permanent storage. The invention can increase the time available for the logging task to perform these other duties. The performance of these other duties is not the subject matter of this invention and will not be discussed further.

SUMMARY OF THE INVENTION

The invention herein seeks to overcome the disadvantages of the prior art by providing an improved method and apparatus for the logging of transaction data from multiple database applications to be transferred to permanent storage for a database management system.

As may be apparent herein there are a number of aspects to the invention herein; for instance: a method is provided for storing transaction data for a plurality of database applications in a multiple access database management system having permanent storage and a transaction log buffer to store data for the database applications before transferring the data to the permanent storage, wherein database connection agents associated with the applications are used to store data in the transaction log buffer, comprising:

granting exclusive write access reservations in the transaction log buffer to a plurality of the database connection agents; and, allowing database connection agents to write transaction data records to previously granted write access reservations while granting exclusive access reservations to other database connection agents.

From another perspective the method includes:

granting an exclusive write access reservation in the transaction log buffer to a database connection agent;

granting an exclusive write access reservation in the transaction log buffer to another database connection agent; while allowing the previous database connection agent to write a data record to its respective write access reservation in the transaction log buffer.

Also, write access reservations may be granted sequentially in the transaction log buffer to database connection agents; while allowing database connection agents to write data records to previously granted write access reservations in the transaction log buffer.

The connection agents preferably write data records independently of and concurrently with other database connection agents to previously granted write access reservations in the transaction log buffer.

The transaction log buffer may be divided into a multiplicity of contiguous logical sections of a predetermined size; for the purpose of sequentially granting contiguous write access reservations in the logical sections of the transaction log buffer to database connection agents; while allowing other database connection agents to write data records concurrently to previously granted write access reservations in the transaction log buffer.

When the reservations fill logical section; the process may beneficially sequentially grant contiguous write access reservations in a next logical section of the transaction log buffer.

The method may include determining if all reservations in a logical section have been filled with data records, copying transaction data records from a data filled logical section to the permanent storage; and, subsequently making the data filled logical section available for data storage.

From another aspect the method provides for storing transaction data for a multiplicity of database applications in a multiple access database management system having permanent storage, and a transaction log buffer divided into a multiplicity of logical sections of predetermined equal size, to temporarily store data for the database applications before transferring the data to the permanent storage, wherein database connection agents associated with the database applications are used to store data in the transaction log buffer, and a logger is used to copy data from the transaction log buffer to the permanent storage, comprising:

allowing database connection agents to write data records asynchronously to any previously granted write access reservations in the transaction log buffer;

sequentially granting contiguous write access reservations in a the logical section of the transaction log buffer to database connection agents until the reservations fill the logical section; and in turn sequentially granting contiguous write access reservations in a next logical section of the transaction log buffer;

counting the number of reservations made in a logical section and counting the number of reservations in the logical section that have been filled with data records comparing the number of reservations made in a logical section with the number of reservations filled with data in the logical section;

when the number of reservations made and the number of reservations filled are equal marking the logical section as a filled logical section;

allowing data records from the filled logical section to be copied to permanent storage; copying transaction data records from the data filled logical section to the permanent storage;

determining when all data records from the filled logical section have been copied to permanent storage;

making the data filled logical section available for data storage when all data records from the data filled logical section have been copied to permanent storage.

Advantageously, in the method the logger may be used to copy data records from the data filled logical section to the permanent storage; and, the data filled logical section will be marked available for data storage after the logger has completed copying data records from the data filled logical section.

From another aspect the method of storing transaction data for a multiplicity of database applications in a multiple access database management system having permanent storage and a transaction log buffer, having a buffer latch to ensure exclusive access for establishing reservations, the transaction log buffer being adapted to store data for the database applications before transferring the data to the permanent storage, wherein database connection agents associated with the database applications are used to store data in the transaction log buffer, includes:

- granting control of the buffer latch at a first position in the transaction log buffer to a first database connection agent requesting write access to write a predetermined transaction data record to the transaction buffer;
- determining the size of the data record;
- updating the position of the log buffer offset while holding the buffer latch to a second position to define a first data reservation in the transaction log buffer between the first and second positions corresponding to the size of the data record;
- granting exclusive write access to the first data reservation to the first database connection agent;
- releasing the control of the latch from the first database connection agent;
- granting control of the buffer latch at the second position in the transaction log buffer to a second database connection agent;
- allowing the first database connection agent to copy the predetermined transaction data record into the first data reservation.

More specifically the method may include granting contiguous write access reservations in the transaction log buffer to database connection agents; while allowing database connection agents to write data records asynchronously to previously granted write access reservations in the transaction log buffer by:

a) granting control of the buffer latch at an initial position in the transaction log buffer to a database connection agent requesting write access to write a predetermined transaction data record to the transaction buffer to define a beginning position of a data reservation for writing;

b) determining the size of the data record of the database connection agent;

c) updating the position of the log buffer offset while holding the latch to an end position for writing to define i) a data reservation for the database applications in the transaction log buffer between the beginning and end positions corresponding to the size of the data record, and ii) an initial position for writing a next data reservation;

d) granting exclusive write access to the data reservation to the database connection agent;

releasing the control of the latch from the database connection agent;

e) granting control of the buffer latch to another database connection agent at the initial position for writing a next data reservation in the transaction log buffer;

f) repeating steps a to e, and allowing any database connection agents to copy predetermined transaction data records into their respective data reservations even while control of the buffer latch is under control of any other database connection agent.

Another aspect of the invention provides data processing system for storing transaction data for a plurality of database applications in a multiple access database management system having permanent storage and a transaction log buffer to store data for the database applications before transferring the data to the permanent storage, wherein database connection agents associated with the applications are used to store data in the transaction log buffer, comprising:

means for Granting exclusive write access reservations in the transaction log buffer to a plurality of the database connection agents; and, means for allowing database connection agents to write transaction data records to previously granted write access reservations while granting exclusive access reservations to other database connection agents.

In addition the invention advantageously provides software that may be incorporated in an article including:

a computer-readable signal bearing medium wherein said medium is a recordable data storage medium or a modulated carrier signal;

means in the medium for storing transaction data for a plurality of database applications in a multiple access database management system having permanent storage and a transaction log buffer to store data for said database applications before transferring said data to said permanent storage, wherein database connection agents associated with said applications are used to store data in said transaction log buffer, comprising:

means for granting exclusive write access reservations in said transaction log buffer to a plurality of said database connection agents; and, means for allowing database connection agents to write transaction data records to previously granted write access reservations while granting exclusive access reservations to other database connection agents.

Another advantageous aspect of the invention provides a computer program product adaptable for embodiment on a computer readable signal-bearing medium comprising computer program code means adapted to perform the steps of the method of the invention when said program is run on a computer.

GLOSSARY

A number of terms are used in this application and are discussed herein:

Database connection agent A database connection agent is a thread or process that performs a task on behalf of a database application; it may run within the DBMS engine and may report when the task has been accomplished.

Log buffer (transaction log buffer) As contemplated herein a database management system has a transaction log buffer that is shared among various database connection agents of the database management system in order to store data in permanent storage of the database management system.

Log record (transaction log record) A log record is a collection of data that represents one or more changes to the data contents of a database management system.

Logger (transaction logging process or task) This is a special process or task in the dbms system which controls the copying of data records from the transaction log buffer to permanent storage, which is usually implemented as disk storage.

Log buffer offset This term marks the location in the log buffer at which a reservation will be started in preparation for the loading of a log record by a database connection agent. The value of the offset is related to the beginning of the log buffer.

Latch A latch in the context of this invention may be implemented as a high speed mutually exclusive locking mechanism that can be used to serialize access to a resource in shared memory or storage. The transaction log buffer has a latch, for which an database connection agent acquires control to prevent another database connection agent from obtaining write access to the buffer. If one database connection agent has control of the latch of the transaction log, another database connection agent would have to wait until the first database connection agent releases the latch until it could gain write access to the transaction log. The latch serializes access to the transaction log buffer. If one database connection agent acquires the latch, other database connection agents have to wait until the latch is released.

Chunk For the purposes of this invention the transaction log buffer may be divided into logical divisions which we will call 'chunks'. In a preferred embodiment of the invention herein a counter is provided for each chunk that is used to track when the chunk has been filled.

Current Chunk For the purposes of this invention, the current chunk is the chunk which contains the log buffer offset.

Chunk Counter There is one chunk counter for each chunk in the log buffer. This is used to keep track of outstanding copies that need to be loaded into the log buffer.

Reservation A reservation is a portion of the log buffer which has been reserved for the exclusive use by one database connection agent for the purpose of loading data.

Under a preferred embodiment of the present invention, the log buffer of a database management system is divided into logical divisions called chunks. The size of a chunk is chosen to be large enough that writing its contents to permanent storage is reasonably efficient and small enough that if the logger needs to wait until a chunk is full before writing its contents to permanent storage, it won't seriously impact database application response time.

In another aspect of this invention, an database connection agent working on behalf of a database application no longer copies transaction log records into the log buffer while holding the log buffer latch. Instead, the latch need only be held long enough to determine the location in the log buffer to which a log record is to be copied, and to update the log buffer offset to represent the location in the log buffer for the start of the next log record. To indicate that the log record data has not yet been copied into the log buffer, the chunk counter is also incremented. In one embodiment of the present invention the incrementing of the chunk counter is done while holding the latch. If the log record spans multiple chunks, the counter for each of the affected chunks is incremented. The log buffer latch is then released in one embodiment of the present invention. After releasing the latch, the database connection agent then copies its transaction log record data to the buffer location (reservation) that was determined when the latch was held. The chunk counter is decremented after the data is copied into the log buffer. Again, if the log record spans multiple chunks, the counter for each of the pertinent chunks is decremented. The log buffer latch does not need to be held for the decrementing of the chunk counter.

Under the preferred embodiment of the invention, the logger is still responsible for writing the contents of the log buffer to permanent storage. The chunk counter allows the logger to determine that a chunk (ie. a section of the log buffer) is filled with log record data. If the chunk counter is greater than zero, there are still outstanding log records to be copied into the chunk. If the chunk counter is zero, there are no outstanding log records to be copied to the chunk. Once the chunk has been filled, the logger is then free to write the contents of the chunk asynchronously to permanent storage. If multiple chunks are filled, the logger will issue asynchronous write requests (the requests are preferably issued sequentially, but the actual writing of the data from the log buffer to permanent storage will occur asynchronously) for each of the chunks. The chunk size should preferably be chosen for good balance for both efficient transference of data to storage (ie. system throughput) and application response time. Writing chunks asynchronously gives the logger an advantage since it can perform other work while the log records are being transferred to permanent storage.

Under an aspect of the invention, the latch is required only for each database connection agent to make its reservation in the log buffer. The serialization of the latch results in the sequential order of these reservations in the log buffer, which can be used to sequentially order the log records to write them to the permanent storage. The writing of the log data to its reservation by one database connection agent is done independently of any other database connection agent making a reservation. Multiple database connection agents independently write log data to their respective reservations. The tracking of the completion of the transference of data into the log buffer is performed by chunk counters.

BRIEF DESCRIPTION OF THE DRAWINGS

The present invention may be best understood from the following detailed description taken in conjunction with the accompanying drawings of which.

PREFERRED EMBODIMENT OF THE INVENTION

In multiple access database management systems shared storage is used to store data from many database applications and accordingly a number of applications frequently have data records that need to be stored in the database of the database management system in order to keep the database current. As indicated previously under prior art transaction storage systems the serial nature of the reservation and storage systems presents a bottleneck to data storage and processing.

Figure 1:
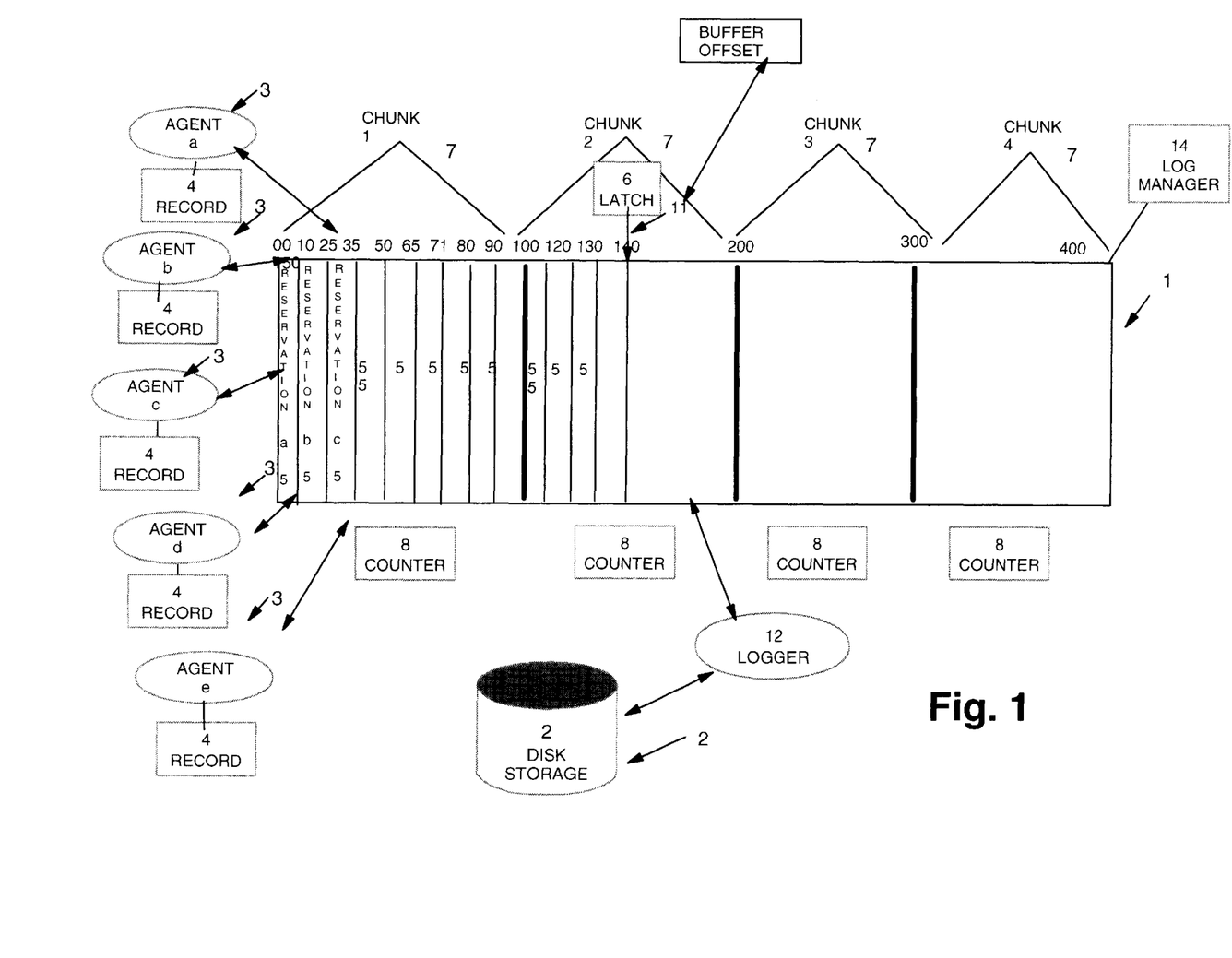
FIG. 1 depicts a diagram of the transaction data storage system of the invention depicting transaction log buffer, main storage and processes used to load data into the main storage using the transaction log buffer.

Referring to FIG. 1 which shows the basic structure of the transaction data storage system of the invention it may be seen that a transaction log buffer 1 is used to temporarily store transaction records 4 of database connection agents 3 intended for storage in permanent storage, in this case disk storage 2.

A number of database connection agents 3 are provided to attend to the storage of transaction data records 4 of database applications using the database management system. The database connection agents are assigned by the database management system to each database application using the database management system. In the preferred embodiment of this invention in a database management system contemplated herein the database connection agents are operable by the database management system to operate asynchronously of each other so that transaction data of each database application can theoretically be loaded into the log buffer without being constrained to wait for the loading of transaction data of another database.

As the transaction log buffer 1 is structured as memory shared among a number of database connection agents it has a latch 6 which is used to serialize access to it to prevent the data of one database connection agent from being overwritten by the data of another database connection agent. The database management system of the invention assigns exclusive control of the latch 6 to a database connection agent 3 requesting the storage of a data record 4 in order to prevent another database connection agent 3 from obtaining write access to the log buffer 1. When one database connection agent 3 has control of the latch 6 of the transaction log buffer 1, another database connection agent 3 must wait until the first database connection agent 3 releases the latch 6 until it can gain write access to the transaction log buffer. As may be appreciated from this discussion the latch 6 serializes access to the transaction log buffer 1 for the purpose of allowing an database connection agent to make a reservation for the storage of data. Unlike prior art storage systems the latch is not used to serialize data loading into the buffer. Loading of the log buffer is allowed asynchronously once a reservation is made, as discussed below.

Under the preferred embodiment of the present invention the transaction logging control system of the database management system operates by first granting, to a requesting database connection agent 3 a reservation 5 for exclusive write access to the transaction log buffer 1 by granting to the database connection agent, the latch 6 of the transaction log buffer 1. The database connection agent determines the starting position of its reservation 5 from the value of the log buffer offset after obtaining the latch. The database connection agent uses the size of its log record to update the buffer offset by incrementing the buffer offset value sufficiently for the storage of the log record. This updated buffer offset will be used to mark the end of the reservation, and the beginning of another reservation. In addition the database connection agent will increment chunk counter 8 for the chunk in which the reservation is contained (This counter will be decremented after a reservation is filled with data). Once this has been done the database connection agent 3 will release the latch 6. After a reservation 5 is made for the database connection agent 3 the database connection agent can load its data record 4 in its reservation 5 in the transaction log buffer 1. Because of the high speed of operation of the latch 6 a number of reservations 5 may possibly be made before data is loaded in one reservation 5. Database connection agents are able to transfer their data into their established reservations, asynchronously of each other without overwriting data of another database connection agent. As may be appreciated from this discussion the storage of data by database connection agents is not restricted to sequential operation and thus can be performed at a higher rate possible than if restricted to sequential operation. It may be preferable to have the buffer filled with contiguous reservations.

In order to increase the efficiency of data transfer from the transaction log buffer to main storage it has been found effective to divide up the transaction log buffer into a number of sections 7 (called chunks in this embodiment). As may be appreciated from FIG. 1, as reservations are established sequentially within the transaction log buffer, the reservations will first fill chunk 1 then chunk 2, etc. As will be understood by those skilled in the art. When one of these chunks has its reservations filled with data it will be efficient to transfer that data to permanent storage. This is done by the logger 12. Chunk counter 8 of each chunk is used to determine when a chunk becomes filled. As discussed above, the counter of a chunk is incremented when a data reservation is made in it and decremented when the database connection agent's data is stored in it. In the preferred embodiment the process of incrementing the counter is performed when a database connection agent has acquired the latch, before it releases it. If the counter starts at 0 when the chunk is empty it will return to zero when all reservations made in the chunk are filled with data. In the situation where a reservation of sufficient size is established straddling multiple chunks the chunk counters of all affected chunks are incremented on reservation establishment and decremented when the reservation is filled.

When a chunk is filled logger 12 will access the chunk and write the contents of all of the reservations in it to permanent storage. When the records have been copied the logger will can notify the relevant database connection agents that the records have been copied successfully. As can be seen from above the logger can advantageously operate asynchronously of the loading of data in the transaction log buffer.

Some transaction logging requests have to wait for the log record data to be written to disk. Other logging requests are completed when the log record data is written into the log buffer. The logger may need to do some processing (such as calculating a page check sum) before it can issue an I/O request to write log data to permanent storage. After the I/O request to write log data to permanent storage completes, the logger may need to inform one or more database connection agents that are waiting for their log record data to be on permanent storage that this has been achieved.

Figure 3:
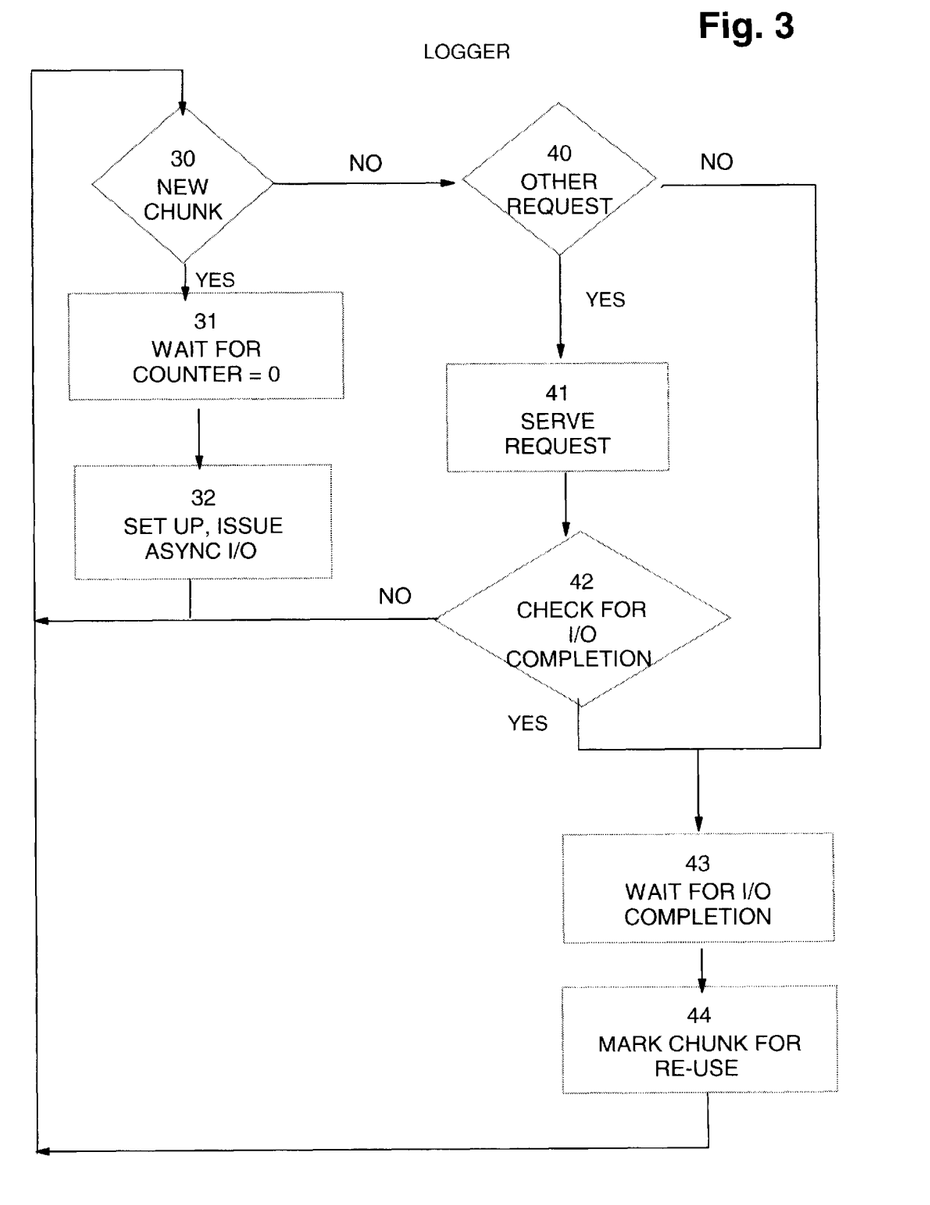
FIG. 3 depicts a flow chart of a logger task for transferring transaction data from the log buffer to permanent storage.

Referring to FIG. 3 which depicts the operation of the logger 12 of the preferred embodiment of the invention it may be seen that when the logger 12 is trying to determine 30 whether a chunk has all its space reserved by waiting 31 for counter to return to 0, meaning that all agents have fully copied their records to the chunk, then the logger prepares 32 the data in the chunk to be written to permanent storage and then issues an asynchronous write request to permanent storage to store the data. If however, it the chunk referenced is not filled 40 the logger looks for other work to do and serves 41 a request for that work It then can check 42 to determine if a previous asynchronous write request to permanent storage has been completed. If not it can check to determine if another chunk is ready to handled. If the I/O has completed successfully 43, ie. Data in the relevant chunk has been successfully loaded into permanent storage, then the chunk is marked for reuse 44 so that database connection agents can reuse it. The logger can perform this reuse marking task.

The invention improves the efficiency of transaction logging I/O throughput between the log buffer and database permanent storage by enabling the asynchronous logging of transaction data.

As we have discussed, objectives of the invention include improving transaction data handling system throughput, as well as response time of applications making changes to the database.

The solution in the preferred embodiment of the invention includes:

1. The logger tries to writes a fixed size of log data to disk. This fixed size of data is called a chunk. The log buffer size is bigger than the chunk size. When there is a lot of log data (more than a chunk) in the log buffer, the logger breaks up the data into multiple chunks and thus will issue multiple write requests for each chunk to write the log data to disk.

2. The logger uses the asynchronous I/O interface provided by the operating system. By using asynchronous writes, the logger can issue write requests before previous write requests have completed. If a chunk is filled with log record data and is ready to be written to disk, the write request for the chunk is issued before the logger prepares any new chunk to be written to disk. The write requests must be made in order and collected in order ('collected' in this context means confirming that data for the write requests have successfully been written to permanent storage).

3. In some cases, database management system processes or tasks may need to wait for their log data to be written to permanent storage before continuing to perform other work. Writing in chunk sizes that are large enough for efficient I/O and small enough that the I/O completes quickly, database connection agents can be notified frequently that their log data has been written to permanent storage. On the other hand, if the logger used write sizes that are much larger than a chunk size, the throughput of the logger would not benefit significantly and DBMS tasks would be notified less frequently that their log data has been written to permanent storage. Using write sizes that are larger than a chunk size will result in poor response time for some of the database applications.

4. When one write request completes, the logger first checks if more log data is available to be written to disk. If there is more log data to be written to disk, the logger will issue the write request for this data before informing any DBMS tasks that are waiting for the log data in the completed write. This means that each chunk should have information about which log records are fully contained in it. The tasks that are waiting their log data to be written to disk can use this information to decide if their requests are completed. Note that the maintenance of this information per chunk is done by the DBMS tasks that make logging requests. Therefore, the overhead of maintaining this information has almost no impact on the throughput of the logger.

5. The DBMS processes or tasks making logging requests are serialized only to the extent needed to determine the position in the log buffer that the log data should be copied into and to update position for the next log record data. Copying of the log record data into the log buffer is not serialized. This improves the speed at which DBMS tasks can copy log record data into the log buffer since multiply DMBS tasks can copy data into the log buffer at the same time. However, this method creates a problem for the logger. The logger needs to ensure that all of the outstanding copies have completed for a chunk before it can issue the write request. This is solved by maintaining a counter for each chunk that represents the number of outstanding copies for the chunk. The counter is incremented by any DMBS task that reserves space in the log buffer chunk prior to copying its log data into the log buffer. The counter is then subsequently decremented after the DBMS task copies the log data into the log buffer. Note that the maintenance of this counter is performed by the DMBS tasks that are making logging requests and not the logger itself. Therefore, this overhead has almost no impact on the throughput of the logger process.

The solution presented in the preferred embodiment improves the throughput of the logger because the logger can have multiple write requests being handled by the disk subsystem at any given time. Since the logger is using asynchronous I/O, it is free to report the completion of previous write requests to any DBMS tasks that are waiting and prepare for new write requests while log data is being written to permanent storage. It also improves the response time of application since the completion of log data writes is reported more frequently then if the logger wrote very large amounts of log data with each write to permanent storage. The improved efficiency in reserving space and copying log data into the log buffer also helps the response time for DMBS tasks that make requests which do not require waiting for the log data to be written to permanent storage.

Figure 2:
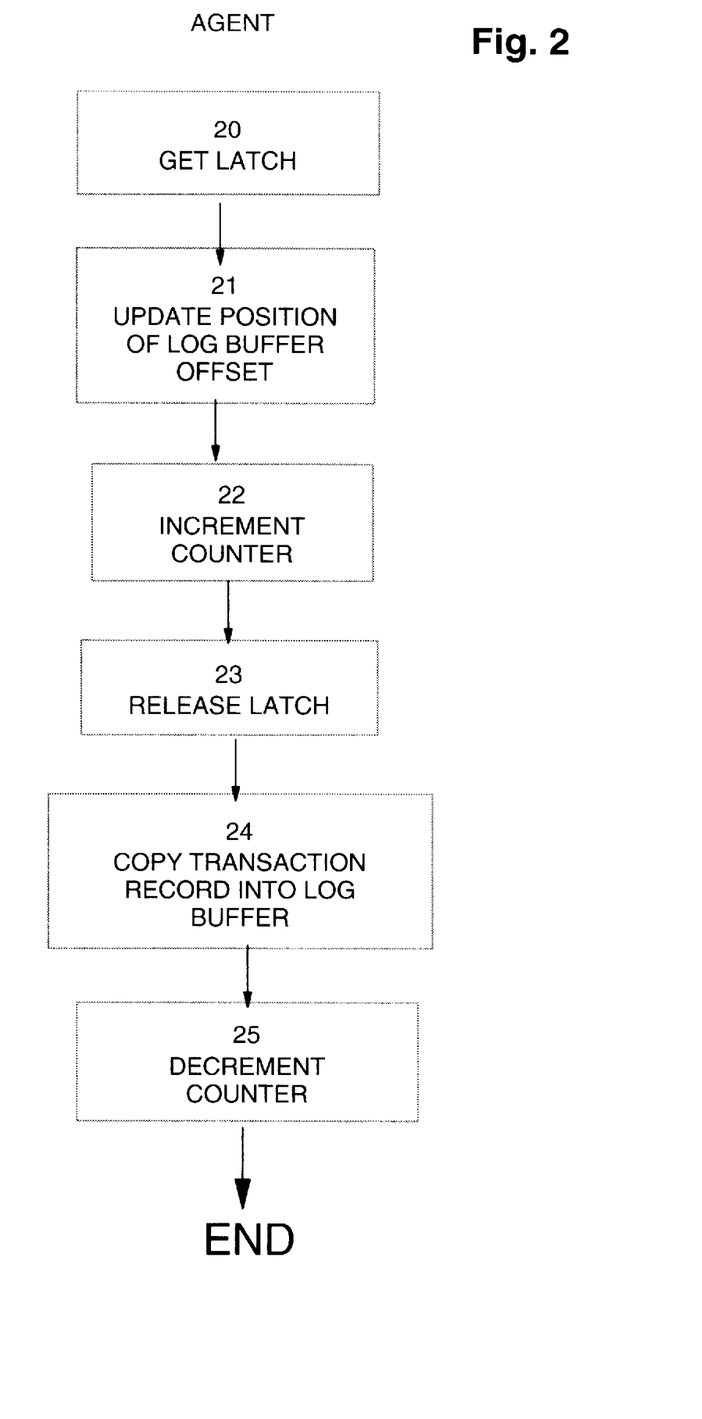
FIG. 2 depicts a flow chart of a logging task for storing transaction data in a log buffer.

The preferred embodiment of the invention herein may be better understood by reference to the following Pseudo Code:

A) Simplified Version of Pseudo Code:

Pseudo code:

Database Connection Agent:

DATABASE CONNECITON AGENT operation of which is depicted in FIG. 2. In particular, FIG. 2 shows the operation of a connection agent which logs a task for storing transaction data in a log buffer.

get 20 latch update 21 position in log buffer increment 22 counter for current chunk release 23 latch copy 24 transaction record to log buffer decrement 25 counter

```
LOGGER:
    loop
    {
        if (there is a new chunk)
        {
            wait for counter to be 0
            set up, issue async I/O
        }
        else
        {
            IO_complete = FALSE
            if (there is other request)
            {
                serve request
                check (but do not wait) for I/O completion, if there
                is I/O complete, set IO_complete = TRUE
            }
            else
            {
                wait for I/O completion
                IO_complete = TRUE
            }
            if (IO_complete)
            {
                mark chunk for reuse
            }
        }
    }
```

The embodiment of the invention in which an exclusive property or privilege is claimed are defined as follows:

1. A method of storing transaction data for a plurality of database applications in a multiple access database management system having permanent storage and a transaction log buffer to store data for said database applications before transferring said data to said permanent storage, wherein database connection agents associated with said applications are used to store data in said transaction log buffer, comprising:

granting exclusive write access reservations in said transaction log buffer to a plurality of said database connection agents; and allowing database connection agents to write transaction data records to previously granted write access reservations while granting exclusive access reservations to other database connection agents.

2. The method of claim 1, comprising:

granting an exclusive write access reservation in said transaction log buffer to a database connection agent;

granting an exclusive write access reservation in said transaction log buffer to another database connection agent; while allowing said previous database connection agent to write a data record to the previously granted write access reservation in said transaction log buffer.

3. The method of claim 2 comprising:

granting an exclusive write access reservation in said transaction log buffer to a database connection agent;

granting, an exclusive write access reservation in said transaction log buffer to another database connection agent for contiguous reservation in said transaction log buffer; while allowing said previous database connection agent to write a data record to the previously granted respective write access reservation in said transaction log buffer.

4. The method of claim 1 comprising:

sequentially granting write access reservations in said transaction log buffer to database connection agents; while allowing database connection agents to write data records to previously granted write access reservations in said transaction log buffer.

5. The method of claim 4 comprising:

sequentially granting contiguous write access reservations in said transaction log buffer to database connection agents; while allowing database connection agents to write data records independently of and concurrently with other database connection agents to previously granted write access reservations in said transaction log buffer.

6. The method of claim 4, comprising:

dividing said transaction log buffer into a multiplicity of contiguous logical sections of a predetermined size;

sequentially granting contiguous write access reservations in said logical sections of said transaction "log buffer to database connection agents; while allowing other database connection agents to write data records concurrently to previously granted write access reservations in said transaction log buffer.

7. The method of claim 6 wherein database connection agents associated with said database applications are used to store data in said transaction log buffer, and a logger is used to copy data from said transaction log buffer to said permanent storage, said transaction log buffer being divided in a plurality of logical sections of predetermined equal size; comprising:

while allowing database connection agents to write data records independently and concurrently to previously granted write access reservations in said transaction log buffer;

sequentially granting contiguous write access reservations in a said logical section of said transaction log buffer to database connection agents until said reservations fill said logical section; and in turn sequentially granting contiguous write access reservations in a next logical section of said transaction log buffer.

8. The method of claim 7 in which reservations of sufficient size may be established straddling adjacent logical sections.

9. The method of claim 6 comprising:

while allowing database connection agents to write data records asynchronously to previously granted write access reservations if any in said transaction log buffer;

sequentially granting contiguous write access reservations in a said logical section of said transaction log buffer to database connection agents until said reservations fill said logical section; and in turn sequentially granting contiguous write access reservations in a next logical section of said transaction log buffer;

determining if all reservations in a logical section have been filled with data records;

copying transaction data records from a data filled logical section to said permanent storage; and subsequently making said data filled logical section available for data storage.

10. The method of claim 9 for storing transaction data for a multiplicity of database applications in a multiple access database management system having permanent storage, and a transaction log buffer divided into a multiplicity of logical sections of predetermined equal size to temporarily store data for said database applications before transferring said data to said permanent storage, wherein database connection agents associated with said database applications are used to store data in said transaction log buffer, and a logger is used to copy data from said transaction log buffer to said permanent storage, comprising:

allowing database connection agents to write data records asynchronously to any previously granted write access reservations in said transaction log buffer;

sequentially granting contiguous write access reservations in a said logical section of said transaction log buffer to database connection agents until said reservations fill said logical section; and in turn sequentially granting contiguous write access reservations in a next logical section of said transaction log buffer;

counting the number of reservations made in a logical section and counting the number of reservations in said logical section that have been filled with data records;

comparing the number of reservations made in a logical section with the number of reservations filled with data in said logical section;

when the number of reservations made and the number of reservations filled are equal marking said logical section as a filled logical section;

allowing data records from said filled logical section to be copied to permanent storage;

copying transaction data records from said data filled logical section to said permanent storage;

determining when all data records from said filled logical section have been copied to permanent storage;

making said data filled logical section available for data storage when all data records from said data filled logical section have been copied to permanent storage.

11. The method of claim 10, comprising:

using said logger to copy data records from said data filled logical section to said permanent storage; and marking said data filled logical section available for data storage after said data logger has completed copying data records from said data filled logical section.

12. The method of claim 10, comprising:
counting the number of reservations made in each logical section and counting the number of reservations in said logical section that have been filled with data records;
comparing the number of reservations made with the number of reservations that have been filled with data within each said logical section;
when the number of reservations made and the number of reservations filled within logical section are equal marking said logical section as a filled logical section;
allowing data records from any filled logical sections to be copied to permanent storage;
using said logger to copy data records from said data filled logical sections to said permanent storage; and
marking said data filled logical sections available for data storage after said logger has completed writing data records from said data filled logical sections to permanent storage.

13. A method of storing transaction data for a multiplicity of database applications in a multiple access database management system having permanent storage and a transaction log buffer, having a buffer latch to ensure exclusive access for establishing reservations, said transaction log buffer being adapted to store data for said database applications before transferring said data to said permanent storage, wherein database connection agents associated with said database applications are used to store data in said transaction log buffer, comprising:
granting control of said buffer latch at a first position in said transaction log buffer to a first database connection agent requesting write access to write a predetermined transaction data record to said transaction buffer;
determining the size of said data record;
updating the position of said log buffer offset while holding the buffer latch to a second position to define a first data reservation in said transaction log buffer between said first and second positions corresponding to the size of said data record;
granting exclusive write access to said first data reservation to said first database connection agent;
releasing said control of said latch from said first database connection agent;
granting control of said buffer latch at said second position in said transaction log buffer to a second database connection agent;
allowing said first database connection agent to copy said predetermined transaction data record into said first data reservation.

14. The method of claim 13 comprising:
sequentially granting contiguous write access reservations in said transaction log buffer to database connection agents; while allowing database connection agents to write data records asynchronously to previously granted write access reservations in said transaction log buffer by:
a) granting control of said buffer latch at an initial position in said transaction log buffer to a database connection agent requesting write access to write a predetermined transaction data record to said transaction buffer to define a beginning position of a data reservation for writing;
b) determining the size of said data, record of said database connection agent;
c) updating the position of said log buffer offset while holding the latch to an end position for writing to define i) a data reservation for said database applications in said transaction log buffer between said beginning and end positions corresponding to the size of said data record and ii) an initial position for writing a next data reservation;
d) granting exclusive write access to said data reservation to said database connection agent;
releasing said control of said latch from said database connection agent;
e) granting control of said buffer latch to another database connection agent at said initial position for writing a next data reservation in said transaction log buffer;
f) repeating steps a to e, and
allowing any database connection agents to copy predetermined transaction data records into their respective data reservations even while control of said buffer latch is under control of any other database connection agent.

15. The method of claim 14, comprising:
sequentially granting contiguous write access reservations in said transaction log buffer to database connection agents; while allowing database connection agents to write data records asynchronously to previously granted write access reservations in said transaction log buffer by:
a) granting control of said buffer latch at an initial position in said transaction log buffer to a database connection agent requesting write access to write a predetermined transaction data record to said transaction buffer to define a beginning position of a data reservation for writing;
b) determining the size of said data record of said database connection agent;
c) updating the position of said log buffer offset while holding said latch to an end position for writing to define i) a data reservation for said database applications in said transaction log buffer between said beginning and end positions corresponding to the size of said data record, and ii) an initial position for writing a next data reservation;
d) granting exclusive write access to said data reservation to said database connection agent;
e) releasing said control of said latch from said database connection agent;
f) granting control of said buffer latch to another database connection agent at said initial position for writing a next data reservation in said transaction log buffer;
g) repeating steps a to f, and
allowing any database connection agents to copy predetermined transaction data records into their respective data reservations even while control of said buffer latch is under control of any other database connection agent.

16. The method of claim 15 for storing transaction data for a multiplicity of database applications in a multiple access database management system wherein said database management system has permanent storage, a transaction log buffer divided into a multiplicity of logical sections of predetermined equal size, to temporarily store data for said database applications before transferring said data to said permanent storage, a latch for said buffer, and a logical section counter associated with each said logical section, wherein database connection agents associated with said database applications are used to store data in said transaction log buffer, said method comprising:

sequentially granting contiguous write access reservations in a logical section of said transaction log buffer to database connection agents; while allowing database connection agents to write data records asynchronously to previously granted write access reservations in said transaction log buffer by:

a) granting control of said buffer latch at an initial position of a logical section in said transaction log buffer to a database connection agent requesting write access to write a predetermined transaction data record to said transaction buffer to define a beginning position of a data reservation for writing;

b) determining the size of said data record of said database connection agent;

c) updating the position of said log buffer offset while holding said latch to an end position for writing to define i) a data reservation for said database applications in said transaction log buffer between said beginning and end positions corresponding to the size of said data record, and ii) an initial position for writing a next data reservation;

d) granting exclusive write access, to said data reservation to said database connection agent;

e) incrementing said logical buffer offset by a predetermined amount from an initial value;

f) releasing said control of said latch from said database connection agent;

g) granting control of said buffer latch to another database connection agent at said initial position for writing a next data reservation in said transaction log buffer;

h) repeating steps a to g until said logical section has been filled with reservations, allowing any database connection agents to copy predetermined transaction data records into their corresponding data reservations in said logical section even while control of said buffer latch is under control of any other database connection agent, and decrementing said logical section counter when data has been stored in a data reservation marking said logical section as full when said counter returns to said initial count, and allowing all transaction data within said logical section to be copied to permanent storage.

17. The method of claim 16 for storing transaction data for a multiplicity of database applications in a multiple access database management system having: permanent storage, a transaction log buffer divided into a multiplicity of contiguous logical sections of predetermined equal size, to temporarily store data for said database applications before transferring said data to said permanent storage, a latch for said buffer, and a logical section counter associated with each said logical section, wherein database connection agents associated with said database applications are used to store data in said transaction log buffer, said method comprising:

sequentially granting contiguous write' access reservations in a logical section of said transaction log buffer to connection agents; while allowing database connection agents to write data records asynchronously to previously granted write access reservations in said transaction log buffer by:

a) granting control of said buffer latch at an initial position of a logical section in said transaction log buffer to a database connection agent requesting write access to write a predetermined transaction data record to said transaction buffer to define a beginning position of a data reservation for writing;

b) determining the size of said data, record of said database connection agent;

c) updating the position of said log buffer offset while holding the latch to an end position for writing to define i) a data reservation for said database applications in said transaction log buffer between said beginning and end positions corresponding to the size of said data record and ii) an initial position for writing a next data reservation;

d) granting exclusive write access to said data reservation to said database connection agent;

e) incrementing said logical section counter by a predetermined amount from an initial count;

f) releasing said control of said latch from said database connection agent;

g) granting control of said buffer latch to another database connection agent at said initial position for writing a next data reservation in said transaction log buffer;

h) repeating steps a to g until said logical section has been filled with reservations;

i) allowing any database connection agents to copy predetermined transaction data records into their respective data reservations in said logical section even while control of said buffer latch is under control of any other database connection agent, and j) decrementing said logical section counter when data has been stored in a data reservation, k) repeating steps a to j for another logical section available for data storage;

marking a logical section as full logical section when its logical section counter returns to its initial count, and allowing all transaction data within a full logical section to be copied to permanent storage.

18. The method of claim 17 wherein said another logical section is contiguous with an immediately preceding logical section.

19. The method of claim 17 wherein a full logical section is marked as available for data storage for connection agents when all transaction data within said full logical section has been copied to permanent storage.

20. The method of claim 17 wherein said another logical section is not contiguous with an immediately preceding logical section.

21. The method of claim 17 in which a logger connection agent is used to copy data asynchronously to said permanent storage, and a pointer is associated with said permanent storage, said method comprising:

l) using said logger connection agent to copy all transaction data from a full logical section to said permanent storage at a position indicated by said pointer;

m) advancing said pointer to the end of transaction data so copied;

n) marking said full logical section from which all transaction data has been copied as available for data storage;

repeating steps 1 to n for another full logical section.

22. The method of claim 18 in which a logger connection agent is used to copy data asynchronously to said permanent storage, and a pointer is associated with said permanent storage, said method comprising:

l) using said logger connection agent to copy all transaction data from a full logical section to said permanent storage at a position indicated by said pointer;

m) advancing said pointer to the end of transaction data so copied;

n) marking said full logical section from which all transaction data has been copied as available for data storage;

repeating steps l to n for another full logical section.

23. The method of claim 19 in which a logger connection agent is used to copy data asynchronously to said permanent storage, and a pointer is associated with said permanent storage, said method comprising:

l) using said logger connection agent to copy all transaction data from a full logical section to said permanent storage at a position indicated by said pointer;

m) advancing said pointer to the end of transaction data so copied;

n) marking said full logical section from which all transaction data has been copied as available for data storage;

repeating steps l to n for another full logical section.

24. The method of claim 20 in which a logger connection agent is used to copy data asynchronously to said permanent storage, and a pointer is associated with said permanent storage, said method comprising:

l) using said logger connection agent to copy all transaction data from a full logical section to said permanent storage at a position indicated by said pointer;

m) advancing said pointer to the end of transaction data so copied;

n) marking said full logical section from which all transaction data has been copied as available for data storage;

repeating steps l to n for another full logical section.

25. The method of claim 17 in which reservations may be established straddling contiguous logical sections tracking said reservations and the filling thereof by counters in all of the logical sections containing said straddling reservations.

26. The method of claim 1 for storing transaction data for a multiplicity of applications in a multiple access database management system having permanent storage and a transaction log buffer to temporarily store data for said applications before transferring said data to said permanent storage, wherein database connection agents associated with said applications are used to store data in said transaction log buffer, and a logger is used to copy data from said transaction log buffer to said permanent storage, comprising:

dividing said transaction log buffer into a multiplicity of logical sections of predetermined size;

sequentially granting contiguous write access reservations in said logical sections of said transaction log buffer to database connection agents; while allowing database connection agents to write data records asynchronously to previously granted write access reservations in said transaction log buffer.

27. The method of claim 13 for storing transaction data in a multiple access database management system having a transaction log buffer into which transaction data of database applications is copied by database connection agents and permanent storage into which transaction data is loaded from said transaction log buffer, comprising:

receiving a request from a first database connection agent to store predetermined transaction data in said transaction log buffer establishing an exclusive write access reservation in said transaction log buffer for said first database connection agent by:

a) determining a data transaction record starting position in said transaction log buffer to store said predetermined transaction data;

b) determining a corresponding amount of storage space in said transaction log buffer to store said predetermined transaction data;

c) determining a transaction data record ending position using said starting position and said amount of storage space;

d) granting exclusive write access of said amount of storage space in said transaction log buffer between said starting position and said ending position to said database connection agent;

repeating steps b to d for establishing another exclusive write access reservation in said transaction log buffer for another database connection agent using said ending position of said write access reservation of said first database connection agent as a starting position for said another exclusive write access reservation, without waiting for said predetermined transaction data of said first database connection agent to be stored in said established write access reservation of said first database connection agent, and storing predetermined transaction data of any database connection agent in the respective established reservation of said database connection agent for said predetermined transaction data.

28. Apparatus for storing transaction data for a plurality of database applications in a multiple access database management system having permanent storage and a transaction log buffer to store data for said database applications before transferring said data to said permanent storage wherein database connection agents associated with said applications are used to store data in said transaction log buffer, comprising:

means for granting exclusive write access reservations in said transaction log buffer to a plurality of said database connection agents; and means for allowing database connection agents to write transaction data records to previously granted write access reservations while granting exclusive access reservations to other database connection agents.

29. The apparatus of claim 28 for storing transaction data for a multiplicity of database applications in a multiple access database management system having permanent storage, and a transaction log buffer divided into a multiplicity of logical sections of predetermined equal size, to temporarily store data for said database applications before transferring said data to said permanent storage, wherein database connection agents associated with said database applications are used to store data in said transaction log buffer, and a logger is used to copy data from said transaction log buffer to said permanent storage, comprising:

means for allowing database connection agents to write data records asynchronously to any previously granted write access reservations in said transaction log buffer;

means for sequentially granting contiguous write access reservations in a said logical section of said transaction log buffer to database connection agents until said reservations fill said logical section; and in turn sequentially granting contiguous write access reservations in a next logical section of said transaction log buffer;

means for counting the number of reservations made in a logical section and counting the number of reservations in said logical section that have been filled with data records;

means for comparing the number of reservations made in a logical section with the number of reservations filled with data in said logical section;

means for marking aid logical section as a filled logical section when the number of reservations made and the number of reservations filled are equal;

means for allowing data records from said filled logical section to be copied to permanent storage;

means for copying transaction data records from said data filled logical section to said permanent storage;

means for determining when all data records from said filled logical section have been copied to permanent storage; and means for making said data filled logical section available for data storage when all data records from said data filled logical section have been copied to permanent storage.

30. The apparatus of claim 29 for storing transaction data for a multiplicity of database applications in a multiple access database management system having permanent storage and a transaction log buffer, having a buffer latch to ensure exclusive access for establishing reservations, said transaction log buffer being adapted to store data for said database applications before transferring said data to said permanent storage, wherein database connection agents associated with said database applications are used to store data in said transaction log buffer, comprising:

means for granting control of said buffer latch at a first position in said transaction log buffer to a first database connection agent requesting write access to write a predetermined transaction data record to said transaction buffer;

means for determining the size of said data record;

means for updating the position of said log buffer offset while holding the buffer latch to a second position to define a first data reservation in said transaction log buffer between said first and second positions corresponding to the size of said data record;

means for granting exclusive write access to said first data reservation to said first database connection agent;

means for releasing said control of said latch from said first database connection agent;

means for granting control of said buffer latch at said second position in said transaction log buffer to a second database connection agent; and means for allowing said first database connection agent to copy said predetermined transaction data record into said first data reservation.

31. The apparatus of claim 30 for storing transaction data for a multiplicity of database applications in a multiple access database management system having: permanent storage, a transaction log buffer divided into a multiplicity of contiguous logical sections of predetermined equal size, to temporarily store data for said database applications before transferring said data to said permanent storage, a latch for said buffer, and a logical section counter associated with each said logical section, wherein database connection agents associated with said database applications are used to store data in said transaction log buffer, said method comprising:

means for sequentially granting contiguous write access reservations in a logical section of said transaction log buffer to connection agents; while allowing database connection agents to write data records asynchronously to previously granted write access reservations in said transaction log buffer including means for:

a) granting control of said buffer latch at an initial position of a logical section in said transaction log buffer to a database connection agent requesting write access to write a predetermined transaction data record to said transaction buffer to define a beginning position of a data reservation for writing;

b) determining the size of said data record of said database connection agent;

c) updating the position of said log buffer offset while holding the latch to an end position for writing to define i) a data reservation for said database applications in said transaction log buffer between said beginning and end positions corresponding to the size of said data record and ii) an initial position for writing a next data reservation;

d) granting exclusive write access to said data reservation to said database connection agent;

e) incrementing said logical section counter by a predetermined amount from an initial count;

f) releasing said control of said latch from said database connection agent;

g) granting control of said buffer latch to another database connection agent at said initial position for writing a next data reservation in said transaction log buffer;

h) repeating steps a to g until said logical section has been filled with reservations i) allowing any database connection agents to copy predetermined transaction data records into their respective data reservations in said logical section even while control of said buffer latch is under control of any other database connection agent, and j) decrementing said logical section counter when data has been stored in a data reservation;

k) repeating steps a to j for another logical section available for data storage;

marking a logical section as full logical section when its logical section counter returns to its initial count, and allowing all transaction data within a full logical section to be copied to permanent storage.

32. The apparatus of claim 31 for storing transaction data in a multiple access database management system having a transaction log buffer into which transaction data of database applications is copied by database connection agents and permanent storage into which transaction data is loaded from said transaction log buffer, comprising:

means for establishing an exclusive write access reservation in said transaction log buffer for a first database connection agent for a request from said first database connection agent to store predetermined transaction data in said transaction log buffer, by:

a) determining a data transaction record starting position in said transaction log buffer to store said predetermined transaction data;

b) determining a corresponding amount of storage space in said transaction log buffer to store said predetermined transaction data;

c) determining a transaction data record ending position using said starting position and said amount of storage space;

d) granting exclusive write access of said amount of storage space in said transaction log buffer between said starting position and said ending position to said database connection agent;

repeating steps b to d for establishing another exclusive write access reservation in said transaction log buffer for another database connection agent using said ending position of said write access reservation of said first database connection agent as a starting position for said another exclusive write access reservation, without waiting for said predetermined transaction data of said first database connection agent to be stored in said established write access reservation of said first database connection agent; and;

storing predetermined transaction data of any database connection agent in the respective established reservation of said database connection agent for said predetermined transaction data.

33. An article comprising:

a computer-readable signal bearing medium wherein said medium is a recordable data storage medium or a modulated carrier signal;

means in the medium for storing transaction data for a plurality of database applications in a multiple access database management system having permanent storage and a transaction log buffer to store data for said database applications before transferring said data to said permanent storage, wherein database connection agents associated with said applications are used to store data in said transaction log buffer, comprising:

means for granting exclusive write access reservations in said transaction log buffer to a plurality of said database connection agents; and means for allowing database connection agents to write transaction data records to previously granted write access reservations while granting exclusive access reservations to other database connection agents.

34. The article of claim 33 for storing transaction data for a multiplicity of database applications in a multiple access database management system having permanent storage, and a transaction log buffer divided into a multiplicity of logical sections of predetermined equal size to temporarily store data for said database applications before transferring said data to said permanent storage, wherein database connection agents associated with said database applications are used to store data in said transaction log buffer, and a logger is used to copy data from said transaction log buffer to said permanent storage, comprising:

means for allowing database connection agents to write data records asynchronously to any previously granted write access reservations in said transaction log buffer;

means for sequentially granting contiguous write access reservations in a said logical section of said transaction log buffer to database connection agents until said reservations fill said logical section; and in turn sequentially granting contiguous write access reservations in a next logical section of said transaction log buffer;

means for counting the number of reservations made in a logical section and counting the number of reservations in said logical section that have been filled with data records means for comparing the number of reservations made in a logical section with the number of reservations filled with data in said logical section;

means for marking said logical section as a filled logical section when the number of reservations made and the number of reservations filled are equal;

means for allowing data records from said filled logical section to be copied to permanent storage;

means for copying transaction data records from said data filled logical section to said permanent storage;

means for determining when all data records from said filled logical section have been copied to permanent storage; and means for making said data filled logical section available for data storage when all data records from said data filled logical section have been copied to permanent storage.

35. The article of claim 34 for storing transaction data for a multiplicity of database applications in a multiple access database management system having permanent storage and a transaction log buffer, having a buffer latch to ensure exclusive access for establishing reservations, said transaction log buffer being adapted to store data for said database applications before transferring said data to said permanent storage, wherein database connection agents associated with said database applications are used to store data in said transaction log buffer, comprising:

means for granting control of said buffer latch at a first position in said transaction log buffer to a first database connection agent requesting write access to write a predetermined transaction data record to said transaction buffer;

means for determining the size of said data record;

means for updating the position of said log buffer offset while holding the buffer latch to a second position to define a first data reservation in said transaction log buffer between said first and second positions corresponding to the size of said data record;

means for granting exclusive write access to said first data reservation to said first database connection agent;

means for releasing said control of said latch from said first database connection agent;

means for granting control of said buffer latch at said second position in said transaction log buffer to a second database connection agent;

means for allowing said first database connection agent to copy said predetermined transaction data record into said first data reservation.

36. The article of claim 35 for storing transaction data for a multiplicity of database applications in a multiple access database management system having: permanent storage, a transaction log buffer divided into a multiplicity of contiguous logical sections of predetermined equal size, to temporarily store data for said database applications before transferring said data to said permanent storage, a latch for said buffer, and a logical section counter associated with each said logical section, wherein database connection agents associated with said database applications are used to store data in said transaction log buffer, said method comprising:

means for sequentially granting contiguous write access reservations in a logical section of said transaction log buffer to connection agents; while allowing database connection agents to write data records asynchronously to previously granted write access reservations in said transaction log buffer including means for:

a) granting control of said buffer latch at an initial position of a logical section in said transaction log buffer to a database connection agent requesting write access to write a predetermined transaction data record to said transaction buffer to define a beginning position of a data reservation for writing;

b) determining the size of said data record of said database connection agent;

c) updating the position of said log buffer offset while holding the latch to an end position for writing to define i) a data reservation, for said database applications in said transaction log buffer between said beginning and end positions corresponding to the size of said data record and ii) an initial position for writing a next data reservation;

d) granting exclusive write access to said data reservation to said database connection agent;
e) incrementing said logical section counter by a predetermined amount from an initial count;
f) releasing said control of said latch from said database connection agent;
g) granting control of said buffer latch to another database connection agent at said initial position for writing a next data reservation in said transaction log buffer;
h) repeating steps a to g until said logical section has been filled with reservations;
i) allowing any database connection agents to copy predetermined transaction data records into their respective data reservations in said logical section even while control of said buffer latch is under control of any other database connection agent, and
j) decrementing said logical section counter when data has been stored in a data reservation;
k) repeating steps a to j for another logical section available for data storage;

marking a logical section as full logical section when its logical section counter returns to its initial count, and allowing all transaction data within a full logical section to be copied to permanent storage.

37. The article of claim 36 for storing transaction data in a multiple access database management system having a transaction log buffer into which transaction data of database applications is copied by database connection agents and permanent storage into which transaction data is loaded from said transaction log buffer, comprising:

means for establishing an exclusive write access reservation in said transaction log buffer for a first database connection agent for a request from said first database connection agent to store predetermined transaction data in said transaction log buffer, by:
a) determining a data transaction record starting position in said transaction log buffer to store said predetermined transaction data;
b) determining a corresponding amount of storage space in said transaction log buffer to store said predetermined transaction data;
c) determining a transaction data record ending position using said starting position and said amount of storage space;
d) granting exclusive write access of said amount of storage space in said transaction log buffer between said starting position and said ending position to said database connection agent;

repeating steps b to d for establishing another exclusive write access reservation in said transaction log buffer for another database connection agent using said ending position of said write access reservation of said first database connection agent as a starting position for said another exclusive write access reservation, without waiting for said predetermined transaction data of said first database connection agent to be stored in said established write access reservation of said first database connection agent; and storing predetermined transaction data of any database connection agent in the respective established reservation of said database connection agent for said predetermined transaction data.

38. A computer program product adaptable for embodiment on a computer readable signal-bearing medium comprising computer program code means adapted to perform all the steps of claim 1 when said program is run on a computer.

39. A computer program product adaptable for embodiment on a computer readable signal-bearing medium comprising computer program code means adapted to perform all the steps of claim 10 when said program is run on a computer.

40. A computer program product adaptable for embodiment on a computer readable signal-bearing medium comprising computer program code means adapted to perform all the steps of claim 17 when said program is run on a computer.

* * * * *

UNITED STATES PATENT AND TRADEMARK OFFICE
CERTIFICATE OF CORRECTION

PATENT NO. : 6,813,623 B2
DATED : November 2, 2004
INVENTOR(S) : Wilding et al.

It is certified that error appears in the above-identified patent and that said Letters Patent is hereby corrected as shown below:

Title page,
Item [*] Notice, should read -- Under 35 U.S.C. 154 (b) the term of this patent shall be extended for 400 days --.

Signed and Sealed this

Twenty-seventh Day of December, 2005

JON W. DUDAS
*Director of the United States Patent and Trademark Office*